Sept. 4, 1934.     J. E. REGAN     1,972,601
COUPLING
Filed Sept. 17, 1930
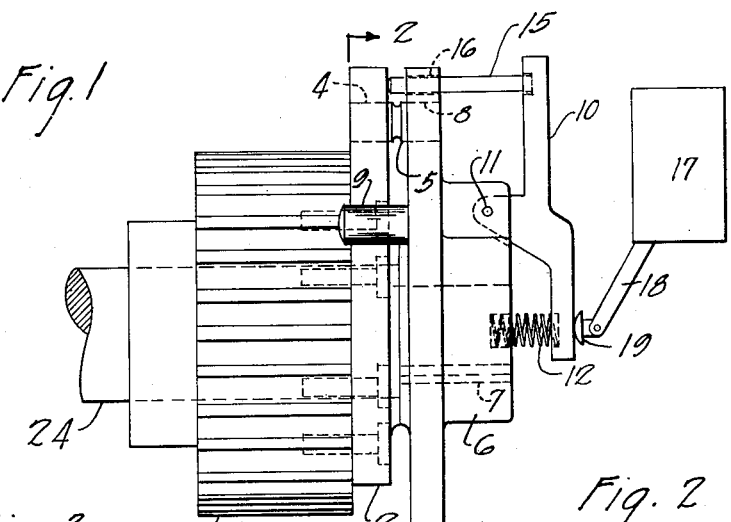
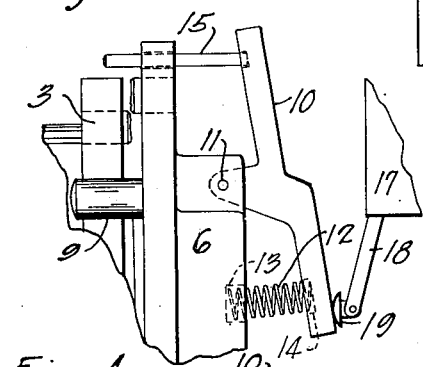
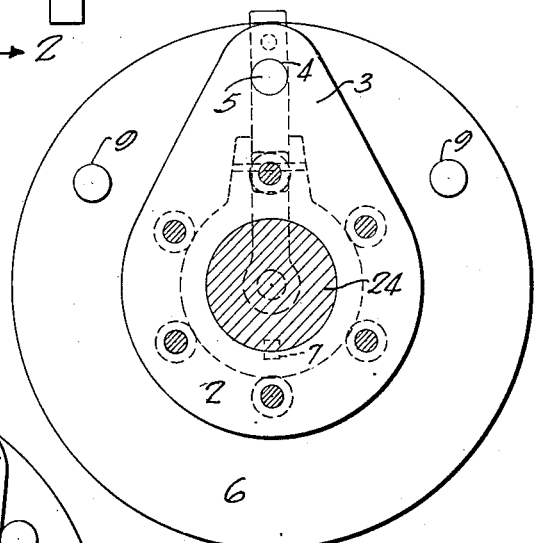
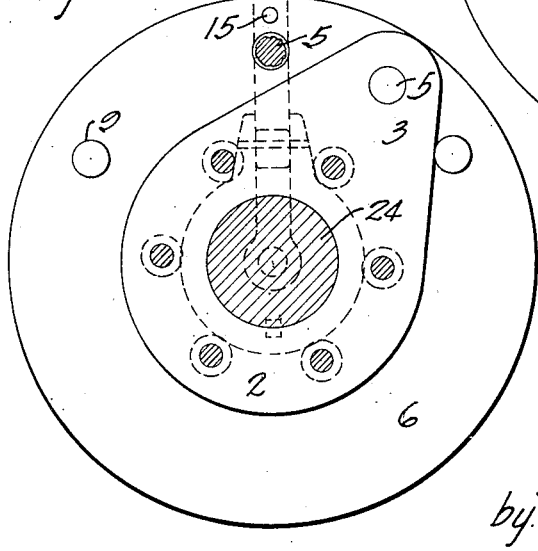
INVENTOR
JOHN E. REGAN
by Roberts, Cushman & Woodbury
ATTYS Patented Sept. 4, 1934

1,972,601

UNITED STATES PATENT OFFICE 1,972,601

COUPLING

John E. Regan, Syracuse, N. Y., assignor to The Lamson Company, Syracuse, N. Y., a corporation of Massachusetts Application September 17, 1930, Serial No. 482,636

11 Claims. (Cl. 192—150)

This invention relates to couplings by which driving and driven elements are connected; more specifically to frangible couplings connecting such elements and provided with means to prevent overload on the driving element.

The primary object of the invention is to provide a release for the driving element when excessive strain which would overload the driving element is put thereupon. Further objects, in addition to providing release of the driving element, are means to stop the driving element upon its release to prevent any damage to the mechanism and also means to prevent continued undesired movement of the driven element and load from its position at release.

The specific embodiment shown is particularly adapted to the operating mechanism of vertical conveyors or elevator systems as shown in my copending application, Serial No. 425,810, filed February 4, 1930, and comprises a shear pin by which the driving member is released upon jamming or overload on the conveyor or elevator, means to stop the rotation of the driving member and means to retain the conveyor or elevator where overload occurs without permitting a further movement of the conveyor or dropping of the elevator.

In the drawing:

Fig. 1 is a side elevational view of the coupling in operative driving position;

Fig. 2 is a sectional view along the line 2—2 of Fig. 1;

Fig. 3 is a fragmentary view corresponding to Fig. 1 of the coupling when the coupled elements have been released; and Fig. 4 is a sectional view corresponding to Fig. 2 showing the mechanism to prevent continued relative rotation between the parts.

The driving element includes the pinion 1 which receives power from any desirable source as, for example, a motor (not shown), which power supply is controlled by any desirable means, as a circuit breaker 17, to which the pinion is preferably attached, as by means of screws, a flange 2 having a projecting portion 3. The flange and pinion are freely rotatable upon a shaft, and the projecting portion 3 has a hole 4 which receives one end of a shear pin 5. The driven element comprises a flange or disk 6 in parallel relation to flange 2 and firmly secured on the end of the shaft 24, by a key 7. This flange 6 has a hole 8 remote from the shaft adjacent to and in alignment with the hole 4 of flange 2, which receives the other end of the shear pin 5. By alignment of holes 4 and 8, replacement of the shear pin is facilitated.

When the movement of the driven flange is interrupted either by sudden jamming of the mechanism by a sudden overload, or by the driven element becoming inoperative, through any cause that would put a sudden strain on the driver, the pin 5 is placed under a strain greater than its shear strength and is ruptured. This permits flanges 2 and 6 to rotate relatively and relieves the driver of any excessive strains.

The flange 6 is also provided with pins 9, secured in any desirable manner to the face of the flange, which are engageable by the projecting portion 3 of flange 2 when the shear pin 5 ruptures and permits relative rotation.

The means by which the operation of the driving element is stopped comprises a circuit breaker 17 or other circuit control device having an arm 18, on the end of which is a button 19. The button engages the inner end of a lever 10 which is pivoted to the flange 6 at 11. A compression spring 12 held in place by recesses 13 and 14 in the end of shaft 3 and in the inner end of the lever 10 acts to push that end of the lever against the button 19. A pin 15 which projects through a hole 16 in flange 6 maintains the outer end of the lever 10 in operative position, one end of the pin resting against the end of the lever, the other end of the pin engaging the remote end of the projection 3 of the flange 2, and acting to retain the spring 12 compressed. The shear pin 5 normally holds the flanges 2 and 6 together and prevents relative rotation, thus maintaining the pin 15 in the position shown in Figs. 1 and 2.

When the shear pin is ruptured by the creation of any abnormal condition in the conveyor, as by excessive load on the shaft 24, the flange 2 will be rotated by the pinion independent of the flange 6 until the projection 3 contacts with either of the pins 9. This independent rotation of the flange 2 permits the pin 15 to slide longitudinally through the hole 16 of flange 6 and allows the spring 12 pressing against the other arm of the lever 10 to shift the lever and operate the breaker arm 18. The circuit is opened by the breaker 17 so that the driving motor is stopped and pinion 1 and flange 2 held stationary. Since the flange projection 3 engages pins 9 any movement of the shaft 24 is limited to the distance between the pins. The movement of the load on the shaft will cause flange 6 to rotate until one of the pins 9 engages the projection 3. Since the flange 2 is held against further rotation by the motor, the flange 6 can not rotate further and the load is held in substantially the position at which rupture took place.

When the condition causing the rupture has been corrected, the flanges 2 and 6 are again joined by inserting a perfect pin 5 and operation of the conveyor is resumed.

I claim:

1. In a device of the character described, a driving member and a driven member rotatable about the same axis, means positively connecting the members together to prevent relative rotation, said means permitting relative movement at excessive loads, means to limit the relative movement of the members, and means operable by said relative movement to engage and stop the driving member.

2. In a device of the character described, a shaft, a driving member freely rotatable on the shaft, a driven member fixed to the shaft and rotatable therewith, a shear pin remote from the axis of the shaft and adapted to rupture at a predetermined load to permit relative rotation of the members, and means to limit the relative rotation of the members upon rupture of the pin.

3. In a device of the character described, a shaft, a driving member freely rotatable on the shaft, a driven member fixed to the shaft and rotatable therewith, a shear pin connecting the members remote from the axis of the shaft and adapted to rupture at a predetermined load to permit relative rotation of the members, means to limit the relative rotation of the members, and means to stop rotation of the driving member upon rupture of the pin.

4. In a device of the character described, a shaft, a driving member freely rotatable on the shaft, a driven member fixed to the shaft and rotatable therewith, a shear pin connecting the members remote from the shaft and adapted to rupture at a predetermined load to permit relative rotation of the members, and means to limit the relative rotation of the members upon rupture of the pin, said means comprising pins on one of the members engageable with a projection on the other member.

5. In a device of the character described, a shaft, a driving flange freely rotatable on the shaft, a driven flange parallel to the driving flange and fixed to the shaft, a shear pin connecting the parallel flanges and adapted to rupture at a predetermined load to permit relative rotation of the flanges, and pins on one of the flanges engageable with a portion of the other flange to limit the relative rotation.

6. In a device of the character described, a shaft, a driving flange freely rotatable on the shaft, a driven flange parallel to the driving flange and fixed to the shaft, a shear pin connecting the parallel flanges and adapted to rupture at a predetermined load to permit relative rotation of the members, pins on one of the flanges engageable with a portion of the other flange to limit the relative rotation, and means to stop the driving flange upon rupture of the shear pin.

7. In a device of the class described, a shaft, a driving member freely rotatable on the shaft, means for driving said member, a driven member fixed to said shaft and rotatable therewith, a shear pin connecting the members remote from the shaft and adapted to rupture at a predetermined load to permit relative rotation of the members, pins carried by one of said members and acting upon the rupture of the shear pin to stop the rotation thereof, and means carried by said driven member and acting when said shear pin is ruptured to stop the operation of said member driving means.

8. In a device of the class described, a shaft, a member freely rotatable on the shaft, a second member fixed to the shaft and rotatable therewith, means for driving one of said members, a shear pin connecting said members to cause them to rotate in unison, said pin being adapted to rupture at a predetermined load to permit relative rotation of the members, means carried by one of said members which, upon the rupture of the shear pin, positively stops such relative rotation, a pin carried by one of said members, and means also carried by said member to advance said pin when the shear pin is ruptured and stop said member driving means.

9. In a device of the class described, a shaft, a member freely rotatable on the shaft, a second member fixed to the shaft and rotatable therewith, means for driving one of said members, a shear pin connecting said members to cause them to rotate in unison, said pin being adapted to rupture at a predetermined load to permit relative rotation of the members, means carried by one of said members which, upon the rupture of the shear pin, positively stops such relative rotation, means for stopping the operation of the member driving means, a pin carried by one of said members, a lever carried by said member and a spring, which when the shear pin is ruptured causes the lever to advance said pin and actuate said operation stopping means.

10. In a device of the class described, a shaft, a member freely rotatable on the shaft, a second member fixed to the shaft and rotatable therewith, means for driving one of said members, a shear pin connecting said members to cause them to rotate in unison, said pin being adapted to rupture at a predetermined load to permit relative rotation of the members, means carried by one of said members which, upon the rupture of the shear pin, positively stops such relative rotation, means for stopping the operation of the member driving means, a pin carried by one of said members, and a lever carried by said member and normally holding said pin in contact with said other member, said lever acting when said shear pin is ruptured and said other member is moved out of contact with the pin, to advance the pin and trip said operation stopping means.

11. In a device of the class described, a shaft, a member freely rotatable on the shaft, a second member fixed to the shaft and rotatable therewith, means for driving one of said members, a shear pin connecting said members to cause them to rotate in unison, said pin being adapted to rupture at a predetermined load to permit relative rotation of the members, means carried by one of said members which, upon the rupture of the shear pin, positively stops such relative rotation, means for stopping the operation of the member driving means, a pin carried by one of said members, and bearing against a portion of the other member when the members rotate in unison, and means for advancing said pin, when the shear pin is ruptured and the portion of the other member is moved out of contact with the pin, and tripping said operation stopping means.

JOHN E. REGAN.